US011890541B2

(12) United States Patent
Hu et al.

(10) Patent No.: US 11,890,541 B2
(45) Date of Patent: Feb. 6, 2024

(54) VIRTUAL OBJECT CONTROL METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Xun Hu, Guangdong (CN); Yulin Wan, Guangdong (CN); Shandong Su, Guangdong (CN); Jianmiao Weng, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 17/452,943

(22) Filed: Oct. 29, 2021

(65) Prior Publication Data
US 2022/0040578 A1    Feb. 10, 2022

Related U.S. Application Data

(63) Continuation of application No. PCT/CN2021/095129, filed on May 21, 2021.

(30) Foreign Application Priority Data

Jun. 6, 2020    (CN) .......................... 202010507622.9

(51) Int. Cl.
*A63F 13/56* (2014.01)
*A63F 13/537* (2014.01)
(52) U.S. Cl.
CPC ............ *A63F 13/56* (2014.09); *A63F 13/537* (2014.09)

(58) Field of Classification Search
CPC ........ A63F 13/537; A63F 13/52; A63F 13/56; A63F 13/58
See application file for complete search history.

(56) References Cited

U.S. PATENT DOCUMENTS

| 5,415,549 A | * | 5/1995 | Logg .................. A63F 13/5255 |
| | | | 434/33 |
| 2004/0157662 A1 | * | 8/2004 | Tsuchiya ............. A63F 13/5378 |
| | | | 463/32 |

(Continued)

FOREIGN PATENT DOCUMENTS

| CN | 105148517 A | 12/2015 |
| CN | 107450812 A | 12/2017 |

(Continued)

OTHER PUBLICATIONS

Office Action dated May 24, 2021 in corresponding Chinese Application No. 2020105076229, along with a partial English translation.

(Continued)

*Primary Examiner* — Steve Rowland
(74) *Attorney, Agent, or Firm* — ARENTFOX SCHIFF LLP

(57) ABSTRACT

A virtual object control method is provided. When there is a need to trigger a skill, a terminal determines a to-be-cast range of a skill and a target virtual object in the to-be-cast range, and displays a cast indication pattern of the skill according to positions of a controlled virtual object and the target virtual object. The terminal adjusts, in response to a position of either virtual object of the controlled virtual object and the target virtual object being changed, the displaying of the cast indication pattern in real time. Thus, it is ensured that the terminal automatically adjusts a pointing direction of the cast indication pattern with the change in the position of the virtual object, so that the cast indication pattern may be associated with the position of the target (Continued)

virtual object. Apparatus and non-transitory computer-readable storage medium counterpart embodiments are also provided.

20 Claims, 8 Drawing Sheets

(56) References Cited

U.S. PATENT DOCUMENTS

| | | | | |
|---|---|---|---|---|
| 2006/0287027 | A1* | 12/2006 | Hardisty | A63F 13/10 |
| | | | | 463/8 |
| 2007/0270215 | A1* | 11/2007 | Miyamoto | A63F 13/525 |
| | | | | 463/32 |
| 2008/0214304 | A1* | 9/2008 | Castle | A63F 13/45 |
| | | | | 463/36 |
| 2009/0181736 | A1* | 7/2009 | Haigh-Hutchinson | |
| | | | | A63F 13/10 |
| | | | | 463/2 |
| 2009/0325660 | A1* | 12/2009 | Langridge | A63F 13/42 |
| | | | | 463/2 |
| 2012/0306775 | A1 | 12/2012 | Miyachi et al. | |
| 2012/0322523 | A1* | 12/2012 | Woodard | A63F 13/69 |
| | | | | 463/2 |
| 2013/0196767 | A1* | 8/2013 | Garvin | A63F 13/56 |
| | | | | 463/36 |
| 2015/0258439 | A1* | 9/2015 | Prosin | A63F 13/00 |
| | | | | 463/31 |
| 2016/0129345 | A1* | 5/2016 | Seok | A63F 13/213 |
| | | | | 463/31 |
| 2018/0147488 | A1* | 5/2018 | Tang | A63F 13/2145 |
| 2018/0339229 | A1 | 11/2018 | He | |

FOREIGN PATENT DOCUMENTS

| | | |
|---|---|---|
| CN | 108144293 A | 6/2018 |
| CN | 108491144 A | 9/2018 |
| CN | 109999493 A | 7/2019 |
| CN | 110548286 A | 12/2019 |
| CN | 111068320 A | 4/2020 |
| CN | 111672127 A | 9/2020 |

OTHER PUBLICATIONS

Zhe, Feng, "Don't know how to set up the action shortcuts in Honor of Kings? You'll understand everything once you've read this", https://zhuanlan.z hihu.com/p/272630 90, Jun. 6, 2017.
International Search Report and Written Opinion dated May 21, 2021 in corresponding application PCT/CN2021/095129.
Office Action dated Nov. 29, 2021, in corresponding Chinese Patent Application No. 202010507622.9 with English translation, 14 pages.
[Main Game] After the Syndra (incorrectly written and edited) spell casting mechanism was changed, why does it feel so unfamiliar? Mar. 31, 2020, 2 pages.
Korean Office Action dated Aug. 16, 2023 in Application No. 10-2021-7033716, with English Translation, pp. 1-47.
Nox App Player, 'Completely conquer MOBA virtual keys (Mobile Legends, Penta Storm)', Video posted on Internet YouTube, Mar. 31, 2020, <https://www.youtube.com/watch?v=U-6THcXgNbM>.

* cited by examiner

VIRTUAL OBJECT CONTROL METHOD AND APPARATUS, DEVICE, AND STORAGE MEDIUM

RELATED APPLICATIONS

This application is a continuation of International Application No. PCT/CN2021/095129, entitled "VIRTUAL OBJECT CONTROL METHOD AND APPARATUS, DEVICE, AND STORAGE MEDIUM" and filed on May 21, 2021, which claims priority to Chinese Patent Application No. 202010507622.9, entitled "VIRTUAL OBJECT CONTROL METHOD AND APPARATUS, DEVICE, AND STORAGE MEDIUM" and filed prior on Jun. 6, 2020. The entire disclosures of the above-identified prior applications are incorporated herein by reference in their entirety.

FIELD OF THE TECHNOLOGY

This application relates to the field of computer technologies, including a virtual object control method and apparatus, a device, and a storage medium.

BACKGROUND OF THE DISCLOSURE

With the development of multimedia technologies and diversification of terminal functions, more and more types of games can be played on a terminal. A multiplayer online battle arena (MOBA) game is a relatively popular game, and a terminal may display a virtual scene in an interface, and display a virtual object in the virtual scene. In a game process, a user may control, through the terminal, a controlled virtual object to battle against a target virtual object being in a camp different from that of the controlled virtual object and controlled by another user or a server.

Currently, in the MOBA game, the user may control, by clicking/tapping a skill key on a game interface, a virtual object to initiate a virtual skill. In the related technology, when the user clicks/taps the skill key, the terminal determines a cast direction of the virtual skill according to a distance between the controlled virtual object and the target virtual object.

However, because positions of the controlled virtual object and the target virtual object are not fixed, it is not easy to hit the target virtual object when the user casts the virtual skill in the cast direction determined based on the foregoing technical solution. As a result, the user usually further needs to manually adjust the cast direction of the virtual skill, and consequently man-machine interaction efficiency is relatively low.

SUMMARY

Embodiments of this disclosure provide a virtual object control method and apparatus, a device, and a storage medium, to reduce operations of a user, and improve man-machine interaction efficiency. The technical solutions are as follows.

An embodiment of this disclosure provides a virtual object control method, including: (1) determining, by processing circuitry in response to a triggering operation on a skill in a virtual scene, a to-be-cast range of the skill; (2) displaying, in response to a target virtual object of a controlled virtual object existing in the to-be-cast range, a cast indication pattern of the skill based on positions of the controlled virtual object and the target virtual object in the virtual scene, the cast indication pattern being used for representing a cast direction of the skill in the virtual scene; and (3) adjusting, in response to a position of the controlled virtual object or the target virtual object being changed, a pointing direction of the cast indication pattern according to the change in the position of the virtual object, the controlled virtual object being a virtual object controlled by a current terminal.

An embodiment of this disclosure further provides a virtual object control apparatus, including: circuitry configured to (1) determine, in response to a triggering operation on a skill in a virtual scene, a to-be-cast range of the skill; (2) cause to be displayed, in response to a target virtual object of a controlled virtual object existing in the to-be-cast range, a cast indication pattern of the skill based on positions of the controlled virtual object and the target virtual object in the virtual scene, the cast indication pattern being used for representing a cast direction of the skill in the virtual scene; and (3) adjust, in response to a position of the controlled virtual object or the target virtual object being changed, a pointing direction of the cast indication pattern according to the change in the position of the virtual object, the controlled virtual object being a virtual object controlled by a current terminal.

An embodiment of this disclosure further provides a virtual object control method, including: (1) determining, by processing circuitry in response to a triggering operation on a skill in a virtual scene, a to-be-cast range of the skill; (2) using, in response to a target virtual object existing in the to-be-cast range, the target virtual object as a cast target of the skill; and (3) creating, in response to the target virtual object being moved out of the to-be-cast range, a reference virtual object on a target position in the to-be-cast range, and updating the reference virtual object to the cast target of the skill.

In this aspect, for some skills that can be cast only when there is a definite cast target, when the determined cast target runs out of a to-be-cast range, a reference virtual object used for providing an aiming auxiliary function is created, to implement skill cast, to simulate a real interaction scene. Even if a target virtual object serving as the cast target moves, a skill that has a specific effect range may still cause specific damage to the escaping target virtual object based on the effect range of the skill, and there is no need to manually adjust the skill cast over and over again, thereby greatly improving man-machine interaction efficiency.

An embodiment of this disclosure further provides a virtual object control apparatus, including: (1) a cast range determining module, configured to determine, in response to a triggering operation on a skill in a virtual scene, a to-be-cast range of the skill; (2) a cast target determining module, configured to use, in response to a target virtual object existing in the to-be-cast range, the target virtual object as a cast target of the skill; and (3) a cast target update module, configured to create, in response to the target virtual object being moved out of the to-be-cast range, a reference virtual object on a target position in the to-be-cast range, and update the reference virtual object to the cast target of the skill.

An embodiment of this disclosure further provides a computer device, including one or more processors (processing circuitry) and one or more memories storing at least one instruction, the at least one instruction being loaded and executed by the one or more processors to implement operations performed in the virtual object control method.

An embodiment of this disclosure further provides a non-transitory computer-readable storage medium, storing at least one instruction, the instruction being loaded and executed by a processor to perform operations performed in the virtual object control method.

An embodiment of this disclosure further provides a computer program product, storing one or more instructions, the one or more instructions being executed by a processor of a terminal, to complete the virtual object control method.

Through the technical solutions provided in this disclosure, when there is a need to trigger a skill, the terminal may determine a to-be-cast range of the skill and a target virtual object in the to-be-cast range, and display a cast indication pattern of the skill according to positions of a controlled virtual object and the target virtual object. The terminal may adjust, in response to a position of either virtual object of the controlled virtual object and the target virtual object being changed, the displaying of the cast indication pattern of the skill in real time. In this way, it may be ensured that after the user triggers the skill, the terminal may automatically adjust a pointing direction of the cast indication pattern of the skill with the change in the position of the virtual object, so that the cast indication pattern may be associated with the position of the target virtual object. That is, during skill cast, the terminal may automatically aim at the target virtual object, and the user does not need to manually aim at the target virtual object, thereby improving man-machine interaction efficiency.

BRIEF DESCRIPTION OF THE DRAWINGS

To describe the technical solutions in the embodiments of this disclosure more clearly, the accompanying drawings for describing the embodiments are briefly described below. The accompanying drawings in the following descriptions show merely some embodiments of this disclosure, and a person of ordinary skill in the art may obtain other accompanying drawings according to these accompanying drawings.

DESCRIPTION OF EMBODIMENTS

Figure 1:
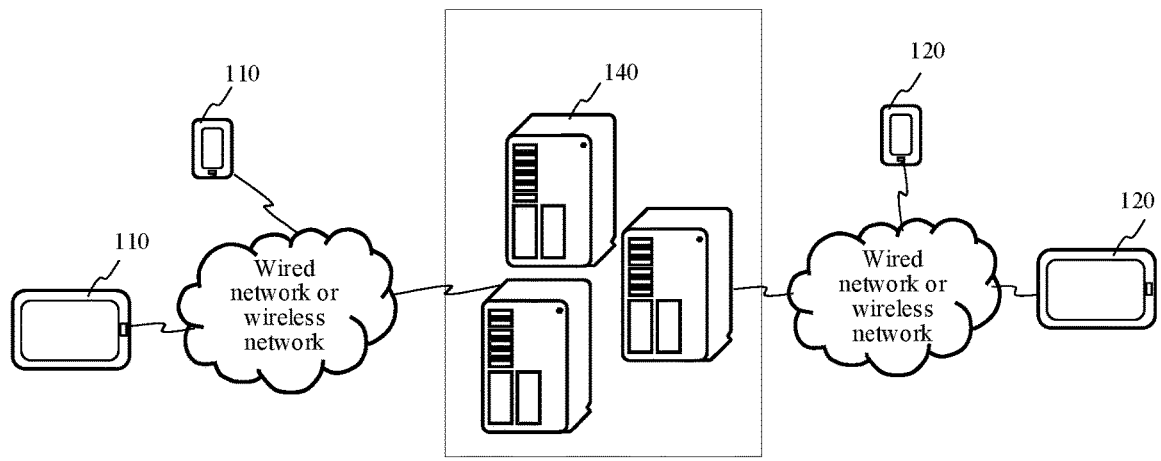
FIG. 1 is a schematic diagram of an implementation environment of a virtual object control method according to an embodiment of this disclosure.

To make objectives, technical solutions, and advantages of this disclosure clearer, the following further describes implementations of this disclosure in detail with reference to the accompanying drawings.

The terms "first," "second," and the like in this disclosure are used for distinguishing between same items or similar items of which effects and functions are basically the same. The "first," "second," and "nth" do not have a dependency relationship in logic or time sequence, and a quantity and an execution order thereof are not limited.

In this disclosure, "at least one" means one or more, and "a plurality of" means two or more. For example, "a plurality of reference face images" means two or more reference face images.

First, terms involved in the embodiments of this disclosure are briefly introduced.

Virtual scene: a virtual scene displayed (or provided) by an application program when run on a terminal. The virtual scene may be a simulated world of a real world, or may be a semi-simulated semi-fictional three-dimensional world, or may be an entirely fictional three-dimensional world. The virtual scene may be any one of a two-dimensional virtual scene, a 2.5-dimensional virtual scene, and a three-dimensional virtual scene. In some embodiments, the virtual scene is further used for a virtual world battle between at least two virtual objects, and there are virtual resources available to the at least two virtual objects in the virtual world. In some embodiments, the virtual world includes a lower left corner region and an upper right corner region that are symmetrical. Virtual objects on two opposing sides occupy the regions respectively, and the objective of each side is to destroy a target building/fort/base/crystal deep in the opponent's region to win victory.

Virtual object: a movable object in a virtual world. The movable object may be at least one of a virtual figure, a virtual animal, and an animation and cartoon figure. In some embodiments, when a virtual world is a three-dimensional virtual world, the virtual objects may be three-dimensional models. Each virtual object has a shape and a volume in the three-dimensional virtual world, and occupies some space in the three-dimensional virtual world. In some embodiments, the virtual object is a three-dimensional character constructed based on three-dimensional human skeleton technology. The virtual object wears different skins to implement different appearances. In some implementations, the virtual objects may be alternatively implemented by using a 2.5-dimensional model or a two-dimensional model. This is not limited in the embodiments of this disclosure.

MOBA: an arena in which different virtual teams on at least two opposing camps occupy respective regions in a virtual world, and contend against each other using specific victory conditions as goals. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. The battle arena may take place in rounds, and each round of the battle arena may have the same map or different maps. Each virtual team includes one or more virtual objects, for example, 1 virtual object, 2 virtual objects, 3 virtual objects, or 5 virtual objects.

MOBA game: a game in which several forts are provided in a virtual world, for users on different camps to control virtual objects to battle in the virtual world, occupy forts or destroy forts of the opposing camp. For example, in the MOBA game, the users may be divided into two opposing camps. The virtual objects controlled by the users are scattered in the virtual world to contend against each other, and the victory condition is to destroy or occupy all enemy forts. The MOBA game takes place in rounds. A duration of one round of the MOBA game is from a moment at which the game starts to a movement at which the victory condition is met.

Targeted skill: a skill cast based on aiming of a user, that is, is, the targeted skill does not have a function of locking an attack object, and can only be used for performing skill cast based on a direction of an operation of the user, and the cast indication pattern may be used for guiding an operation of the user, to guide, in a patterned manner, the user to determine selection of a skill cast direction through a touch operation, and then perform, after detecting a cast operation of the user on the skill, skill cast along the pointing direction of the cast indication pattern. The targeted skill cannot ensure that the attack object can be hit definitely.

Locking skill: a skill cast based on a position of a virtual object, and the locking skill usually cannot be triggered when no attack object exists in an action range of the locking skill. However, when an attack object exists in the action range of the locking skill, after the user triggers the locking skill, the terminal does not display the cast indication pattern, but directly hits the attack object, and if the user casts the locking skill, it may be ensured that the skill hits an enemy.

FIG. 1 is a schematic diagram of an implementation environment of a virtual object control method according to an embodiment of this disclosure. Referring to FIG. 1, the implementation environment includes: a first terminal 110, a second terminal 120, and a server 140.

The first terminal 110 may be a smartphone, a tablet computer, a smart television, a desktop computer, a portable computer, or another device. A client supporting displaying of a virtual scene is installed and run on the first terminal 110, and the client may be a multiplayer online battle program. When the first terminal runs the client, a user interface of the client is displayed on a screen of the first terminal 110. The client may be any one of a military simulation program, a MOBA game, an escape shooting game, and a simulation game (SLG). In this embodiment, an example in which a client is a MOBA game is used for description. The first terminal 110 is a terminal used by a first user. The first user uses the first terminal 110 to control a first virtual object located in the virtual scene to perform activities, and the first virtual object may be referred to as a controlled virtual object of the first user. The activities of the first virtual object include, but are not limited to: at least one of adjusting body postures, crawling, walking, running, riding, jumping, driving, picking, shooting, attacking, and throwing. For example, the first virtual object is a first virtual character such as a simulated character role or a cartoon character role.

A client supporting a virtual scene is installed and run on the second terminal 120, and the client may be a multiplayer online battle program. When the second terminal 120 runs the client, a user interface of the client is displayed on a screen of the second terminal 120. The client may be any one of a military simulation program, a MOBA game, an escape shooting game, and an SLG game. In this embodiment, an example in which a client is a MOBA game is used for description. The second terminal 120 is a terminal used by a second user. The second user uses the second terminal 120 to control a second virtual object located in the virtual scene to perform activities, and the second virtual object may be referred to as a controlled virtual object of the second user. For example, the second virtual object is a second virtual character, such as a simulated character role or a cartoon character role.

In some embodiments, the first virtual character and the second virtual character are located in the same virtual scene. In some embodiments, the first virtual character and the second virtual character may belong to the same camp, the same team, or the same organization, have a friend relationship, or have a temporary communication permission. In some embodiments, the first virtual character and the second virtual character may belong to different camps, different teams, or different organizations, or have a hostile relationship with each other.

In some embodiments, the client installed on the first terminal 110 is the same as the client installed on the second terminal 120, or the clients installed on the two terminals are the same type of clients of different operating system platforms (Android system or iOS system). The first terminal 110 may generally refer to one of a plurality of terminals, and the second terminal 120 may generally refer to another one of a plurality of terminals. In this embodiment, only the first terminal 110 and the second terminal 120 are used as an example for description. The device types of the first terminal 110 and the second terminal 120 are the same or different.

In some embodiments, the server 140 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The server 140 may provide a back-end service to the client for displaying the virtual scene. The first terminal 110 and the second terminal 120 may be connected to the server 140 by using a wireless network or a wired network. This is not limited in this disclosure.

To more clearly describe the technical solutions provided in this disclosure, first using a MOBA game as an example, an interface of the MOBA game is described.

Figure 2:
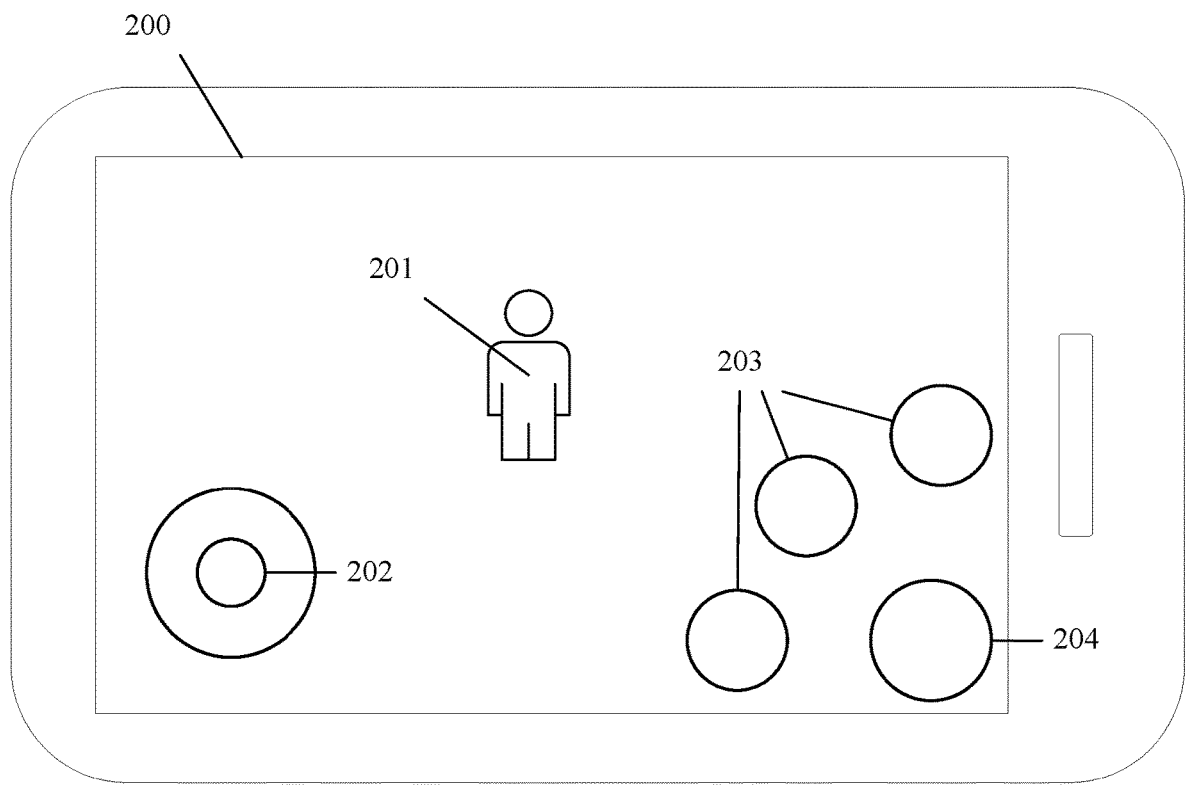
FIG. 2 is a schematic diagram of a MOBA game interface according to an embodiment of this disclosure.

Referring to FIG. 2, 200 is a game interface, the game interface 200 displays a controlled virtual object 201, and a user may control a behavior of the virtual object 201 in a virtual scene through the following keys.

Joystick 202: The user may touch the joystick 202 to control the controlled virtual object to move in the virtual scene. In some cases, the user may alternatively touch the joystick 202 to control a movement direction of an affiliated virtual object of the controlled virtual object, where the affiliated virtual object may be a virtual object summoned by the controlled virtual object through a virtual skill.

Skill key 203: The user may click/tap different skill keys 203 to cast different skills. In some cases, the user may alternatively drag a skill key 203 to control a cast direction of a skill. In one embodiment, the skill key is a skill button.

Attack key 204: The user may click/tap the attack key 204 to control a virtual object to perform an "ordinary attack", and the user may set different "ordinary attack" methods for different virtual objects. For example, the user may set, for a first type of virtual objects, an "ordinary attack" method to "preferentially attack a closest unit", and the user may set, for a second type of virtual objects, an "ordinary attack" method to "preferentially attack a unit with a lowest health point". The terminal may control, according to the "ordinary attack" methods that are set by the user, controlled virtual objects to perform different "ordinary attack" methods when the user clicks/taps the attack key 204.

Figure 3:
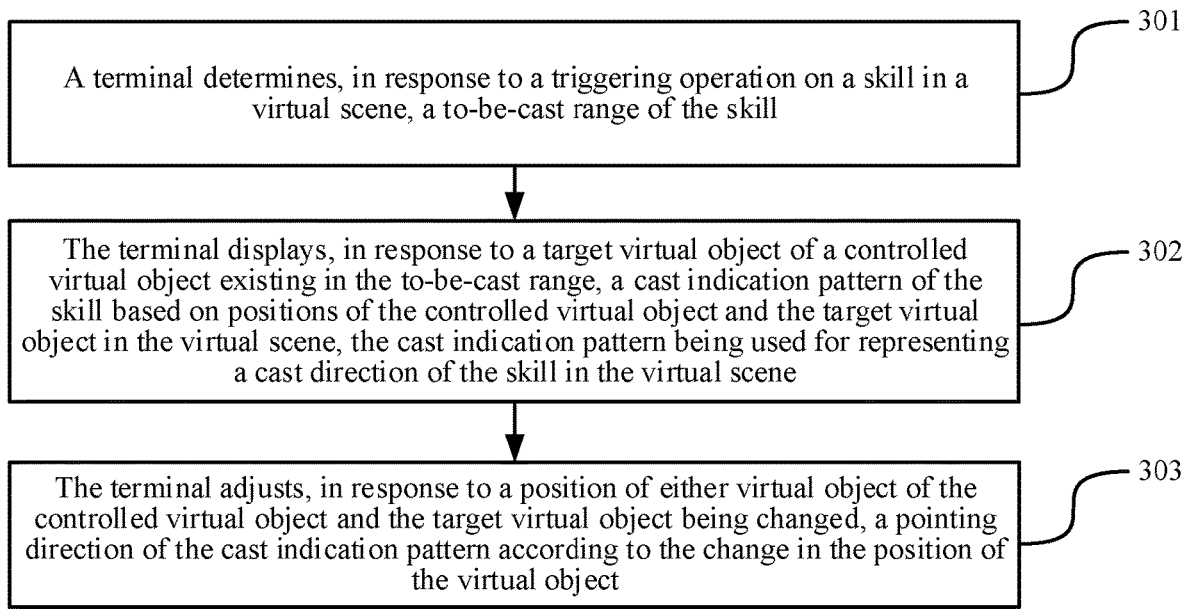
FIG. 3 is a flowchart of a virtual object control method according to an embodiment of this disclosure.

FIG. 3 is a flowchart of a virtual object control method according to an embodiment of this disclosure. The method may be performed by a terminal device, for example, the first terminal 110 and the second terminal 120 shown in FIG. 1. Referring to FIG. 3, the method includes the following steps.

In step 301, a terminal determines, in response to a triggering operation on a skill in a virtual scene, a to-be-cast range of the skill.

The to-be-cast range of the skill may represent a range that the skill may affect. For example, for a skill of launching flying props, a to-be-cast range may be a range formed by a set of maximum distances by which the flying props can fly. For a displacement skill, a to-be-cast range may be a range formed by a set of maximum distances by which virtual objects can moves.

In step 302, the terminal displays, in response to a target virtual object of a controlled virtual object existing in the to-be-cast range, a cast indication pattern of the skill based on positions of the controlled virtual object and the target virtual object in the virtual scene, the cast indication pattern being used for representing a cast direction of the skill in the virtual scene.

The controlled virtual object is a virtual object controlled by a current terminal, and the target virtual object is a virtual object in a camp different from that of the controlled virtual object. The cast indication pattern of the skill may be used for presenting a cast direction and an action range of the skill to the user after the skill is cast, and the user may predict a cast effect of the skill through the cast indication pattern.

In step 303, the terminal adjusts, in response to a position of either virtual object of the controlled virtual object and the target virtual object being changed, a pointing direction of the cast indication pattern according to the change in the position of the virtual object.

The controlled virtual object is a virtual object controlled by a current terminal, and the target virtual object is a virtual object in a camp different from that of the controlled virtual object.

Through the technical solutions provided in this disclosure, when there is a need to trigger a skill, the terminal may determine a to-be-cast range of the skill and a target virtual object in the to-be-cast range, and display a cast indication pattern of the skill according to positions of a controlled virtual object and the target virtual object. The terminal may adjust, in response to a position of either virtual object of the controlled virtual object and the target virtual object being changed, the displaying of the cast indication pattern of the skill in real time. In this way, it may be ensured that after the user triggers the skill, the terminal may automatically adjust a pointing direction of the cast indication pattern of the skill with the change in the position of the virtual object, so that the cast indication pattern may be associated with the position of the target virtual object. That is, during skill cast, the terminal may automatically aim at the target virtual object, and the user does not need to manually aim at the target virtual object, thereby improving man-machine interaction efficiency.

Figure 4:
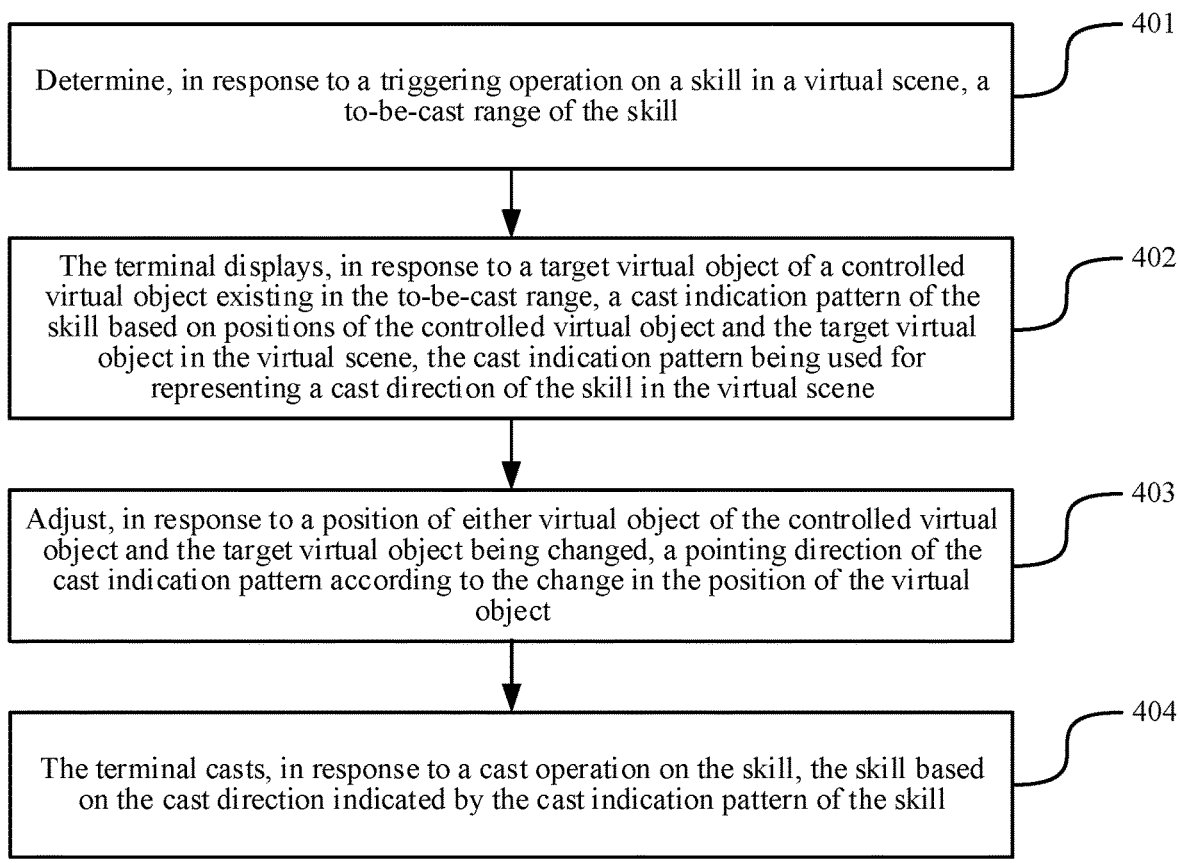
FIG. 4 is a flowchart of a virtual object control method according to an embodiment of this disclosure.

FIG. 4 is a flowchart of a virtual object control method according to an embodiment of this disclosure. The method may be performed by a terminal device, for example, the first terminal 110 and the second terminal 120 shown in FIG. 1. Referring to FIG. 4, the method includes the following steps:

In step 401, in response to a triggering operation on a skill in a virtual scene, a to-be-cast range of the skill is determined.

For description of the to-be-cast range of the skill, reference may be made to the foregoing description in step 301, and details are not described herein. Additionally, the skill involved in in this embodiment of this disclosure is a targeted skill instead of the locking skill.

In some embodiments, the terminal may trigger the skill in response to a touch operation on a first region of a skill key, and determine the to-be-cast range of the skill, where the skill key includes the first region and a second region, and the first region and the second region correspond to different skill cast direction determining methods. The skill cast direction determining methods may include automatic determining and manual determining, where the automatic determining means that after a skill is triggered, the terminal automatically determines a cast direction of the skill, and the manual determining means that after a skill is triggered, the user needs to manually adjust a cast direction of the skill. In some embodiments, the first region corresponds to automatic determining, and the second region corresponds to manual determining. In this case, the first region may also be referred to as "dead zone," a skill cast direction determining method corresponding to the first region may be referred to as "quick spell cast," and a skill cast direction determining method corresponding to the second region may be referred to as "active aiming spell cast." In this implementation, the user may touch different positions on the skill key to select skill cast direction determining methods, thereby improving man-machine interaction efficiency.

Figure 5:
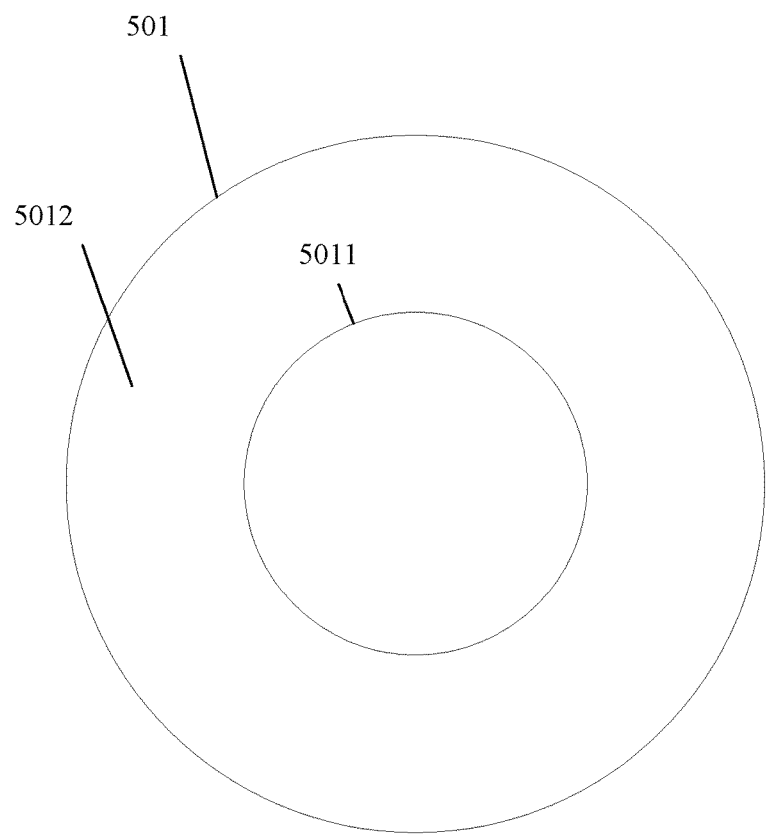
FIG. 5 is a schematic diagram of a skill key according to an embodiment of this disclosure.

For example, referring to FIG. 5, 501 is a skill key, 5011 is a first region of the skill key 501, and 5012 is a second region of the skill key 501. The skill key 501 may be a round key with the radius R, the first region 5011 may be a circle with the radius r concentric with the skill key 501, where r<R, and the second region 5012 is a circular ring region in the skill key 501 other than the first region 5011. The terminal may detect a position on which the user touches a screen, and determine, according to a distance between the position on which the user touches the screen and a center position of the skill key 501, whether the user touches the first region 5011 or the second region 5012 of the skill key 501. In response to the distance between the position on which the user touches the skill key 501 and the center position of the skill key 501 being in a range (0, r), the terminal may determine that the user touches the first region 5011 of the skill key 501; and in response to the distance between the position on which the user touches the skill key 501 and the center position of the skill key 501 being in a range (r, R), the terminal may determine that the user touches the second region 5012 of the skill key 501. In response to the terminal detecting that the user touches the first region 5011 of the skill key 501, the terminal may obtain skill parameters of a skill corresponding to the skill key 501, where the skill parameters may include a farthest cast distance of the skill. The terminal may determine a to-be-cast range of the skill by using the first position of the controlled virtual object in the virtual scene as a center of a circle, and using the farthest cast distance of the skill as the radius.

Certainly, the foregoing description for the shape of the skill key is performed for ease of understanding, and in another possible implementation, the skill key may alternatively be set to a different shape. This is not limited in this embodiment of this disclosure.

Figure 6:
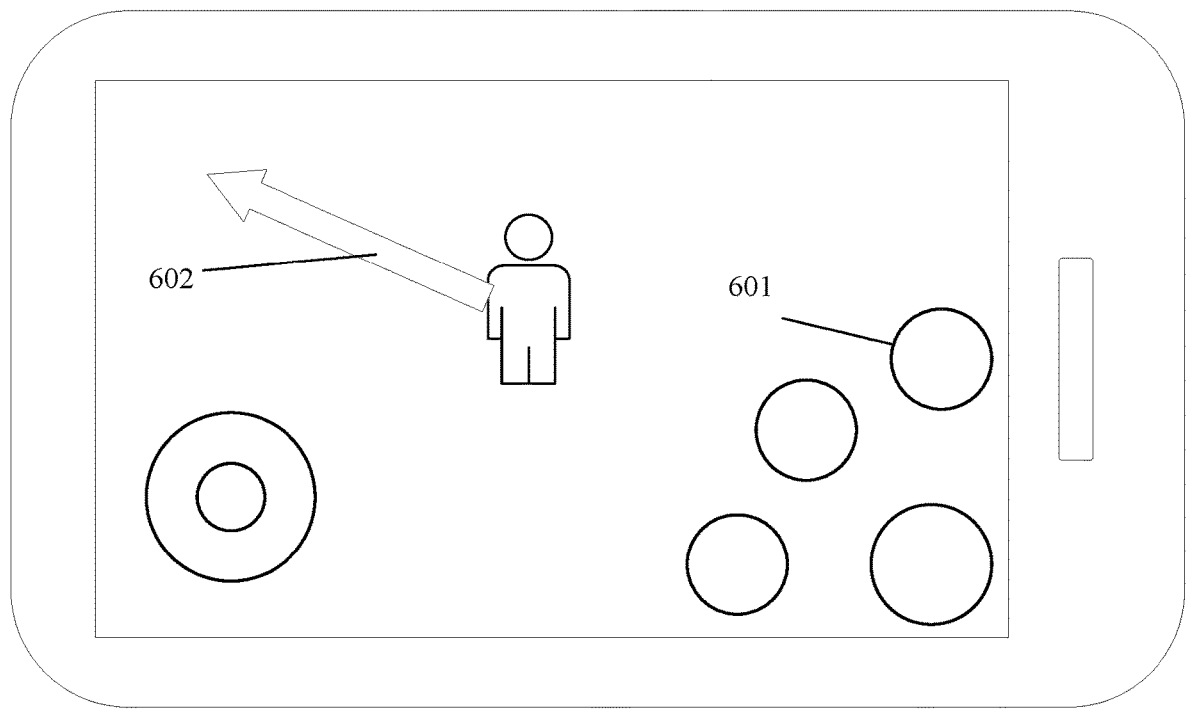
FIG. 6 is a schematic diagram of an interface according to an embodiment of this disclosure.

In addition, the terminal may display, in response to a dragging operation on the second region of the skill key, the cast indication pattern of the skill based on a position indicated by the dragging operation. The terminal may adjust, in response to the position indicated by the dragging operation being changed, the displaying of the cast indication pattern of the skill with the change in the position indicated by the dragging operation. The cast indication pattern of the skill may be used for presenting a cast direction and an action range of the skill to the user after the skill is cast, and the user may predict a cast effect of the skill through the cast indication pattern. In a MOBA game, the cast indication pattern of the skill may also be referred to as a skill indicator. Referring to FIG. 6, after a user touches a skill key 601, a terminal may display a cast indication pattern shown by 602.

For example, the terminal may display, based on a correspondence between screen coordinates of the position indicated by the dragging operation and coordinates in the virtual scene, the cast indication pattern of the skill in the virtual scene. The terminal may determine, in response to the screen coordinates of the position indicated by the dragging operation being changed, the displaying end point of the cast indication pattern of the skill in real time based on the correspondence between the screen coordinates and the coordinates in the virtual scene, and adjust the displaying of the cast indication pattern of the skill according to the change of the displaying end point.

In some embodiments, the terminal may trigger the skill in response to a click/tap operation on a skill key, and determine the to-be-cast range of the skill. For example, the terminal may detect a position on which the user touches a screen, and determine, according to a distance between the position on which the user touches the screen and a center position of the skill key, whether the user touches the skill key. In response to the distance between the position on which the user touches the screen and the center position of the skill key meeting a target distance condition, the terminal determines that the user touches the skill key, and then begins timing. In response to the touch operation of the user being ended, the terminal may determine a duration of an interval between the beginning of touching the skill key by the user and the end of touching the skill key. In response to the duration being less than a duration threshold, the terminal may obtain skill parameters of a skill corresponding to the skill key, where the skill parameters may include a farthest cast distance of the skill. The terminal may determine a to-be-cast range of the skill according to the first position of the controlled virtual object in the virtual scene and the farthest cast distance of the skill, and this implementation may correspond to the foregoing "quick spell cast" skill cast direction determining manner. Correspondingly, the user may touch the skill key for a relatively long time to implement the "active aiming spell cast" skill cast direction determining manner, that is, if the terminal determines that a duration for which the user touches the skill key is greater than the duration threshold, it may be determined that the skill cast direction determining manner is "active aiming spell cast". In this implementation, the user may change a click/tap manner to select skill cast direction determining manners, thereby improving man-machine interaction efficiency.

In step 402, the terminal displays, in response to a target virtual object of a controlled virtual object existing in the to-be-cast range, a cast indication pattern of the skill based on positions of the controlled virtual object and the target virtual object in the virtual scene, the cast indication pattern being used for representing a cast direction of the skill in the virtual scene.

The controlled virtual object is a virtual object controlled by a current terminal, and the target virtual object is a virtual object in a camp different from that of the controlled virtual object. The cast indication pattern of the skill may be a pattern pointing from the position of the controlled virtual object to the position of the target virtual object, and is used for reminding the user of the cast direction of the skill in the virtual scene.

Figure 7:
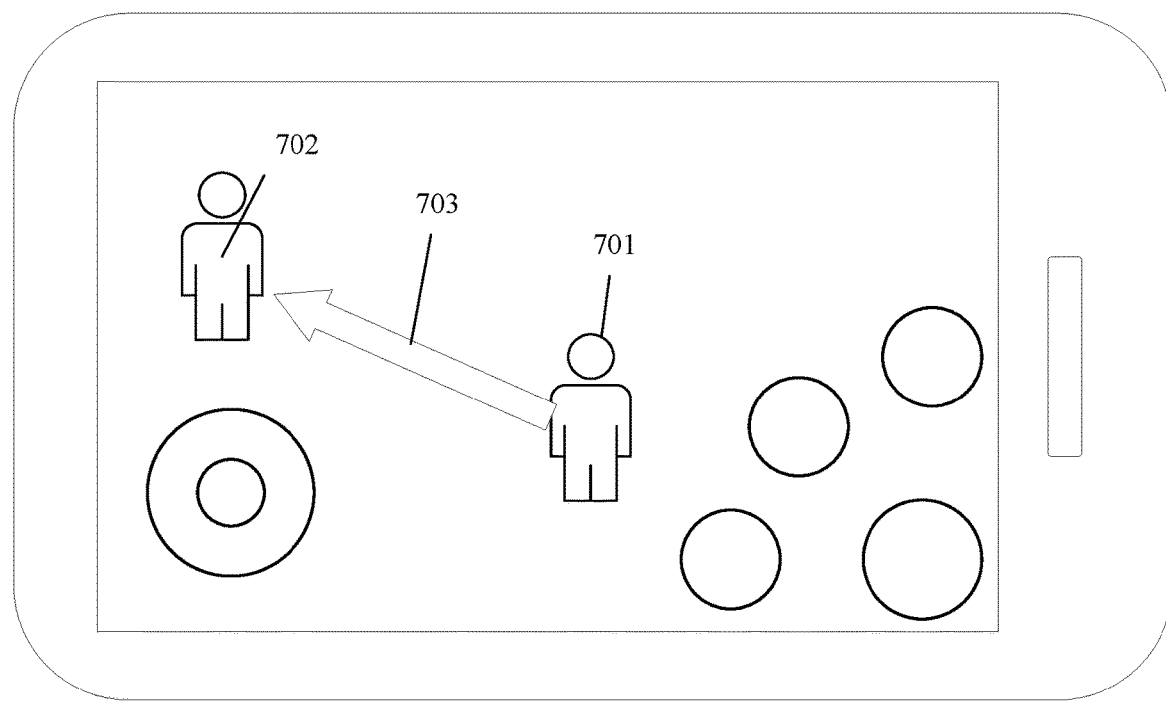
FIG. 7 is a schematic diagram of an interface according to an embodiment of this disclosure.

In some embodiments, the terminal may determine a displaying start point of the cast indication pattern of the skill according to a first position of the controlled virtual object in the virtual scene. The terminal may determine a displaying end point of the cast indication pattern of the skill according to a second position of the target virtual object in the virtual scene. The terminal may display the cast indication pattern of the skill based on the displaying start point and the displaying end point. For example, referring to FIG. 7, the terminal may obtain a first position 701 of the controlled virtual object in a virtual scene from a server, and a second position 702 of the target virtual object in the virtual scene, and display a cast indication pattern 703 of the skill by using the first position as a displaying start point and the second position as a displaying end point. The user may observe the cast indication pattern to visually see cast guidance of casting the skill, and the user may cast the skill according to the cast guidance, thereby improving a hit rate of the skill and man-machine interaction efficiency.

In some embodiments, in response to at least two target virtual objects of the controlled virtual object existing in the to-be-cast range, the terminal may determine a first virtual object in the at least two target virtual objects according to object information of the at least two target virtual objects, where the object information includes, but is not limited to, a distance between a virtual object and the controlled virtual object and a health value of the virtual object, the first virtual object is a virtual object whose object information meets a target condition, the virtual object meeting the target condition may be a virtual object of the at least two target virtual objects that is closest to the controlled virtual object, or may be a virtual object of the at least two target virtual objects whose health value is least, or certainly may be a virtual object meeting another condition. This is not limited in this embodiment of this disclosure.

Using a MOBA game as an example, the user controls a "hero" to cast a skill A, opposing "hero" A and "hero" B exist in a to-be-cast range of the skill A, and when a virtual object meeting a target condition is a virtual object of the at least two target virtual objects that is closest to the controlled virtual object, the terminal may obtain distances between the "hero" A and the "hero" B and the "hero" controlled by the user. When a distance between the "hero" A and the "hero" controlled by the user is five meters, and a distance between the "hero" B and the "hero" controlled by the user is eight meters, the terminal may determine the "hero" A as the first virtual object. The terminal may use a position of the "hero" A in the game scene as a displaying end point of a skill indicator, use a position of the "hero" controlled by the user in the game scene as a displaying start point of the skill indicator, and display the skill indicator based on the displaying start point and the displaying end point.

Certainly, when a virtual object meeting a target condition is a virtual object of the at least two target virtual objects whose health value is least, the terminal may alternatively obtain health points of the "hero" A and the "hero" B. When a health point of the "hero" A is 456 and a health point of the "hero" B is 654, the terminal may determine the "hero" B as the first virtual object. The terminal may use a position of the "hero" B in the game scene as a displaying end point of a skill indicator, use a position of the "hero" controlled by the user in the game scene as a displaying start point of the skill indicator, and display the skill indicator based on the displaying start point and the displaying end point.

In addition, the terminal may further display the cast indication pattern according to a state of the target virtual object, which may include the following three steps 1, 2 and 3.

1. In response to a target virtual object of a controlled virtual object existing in a to-be-cast range, the terminal may determine a state of the target virtual object, and in response to the target virtual object being in a target state, the terminal displays the cast indication pattern of the skill based on positions of the controlled virtual object and the target virtual object in the virtual scene.

In response to the target virtual object being in another state, the terminal may not perform the operation of displaying the cast indication pattern of the skill, and the terminal may determine a state of the target virtual object in real time; and in response to the target virtual object being converted from another state into the target state, the terminal may perform the operation of displaying the cast indication pattern of the skill.

In this implementation, the terminal may determine, according to the state of the target virtual object, whether to display the cast indication pattern, to avoid a case that the user casts the skill in a hurry, but has not generated a corresponding effect, to improve the hit rate of the skill, thereby improving man-machine interaction efficiency, and improving game experience of the user.

Using a MOBA game as an example, states of a "hero" may include: selectable states and unselectable states, where the unselectable states may include "hero death," and field of view loss of a "hero," such as, the "hero" entering "grass" or the "hero" entering an invisible state, the "hero" leaving the to-be-cast range of the skill, and the "hero" using an invincible skill or invincible prop, etc. In the MOBA game, the target state may be a selectable state. When a hostile "hero" exists in the to-be-cast range of the skill, the terminal may obtain state information of the hostile "hero" from the server, the state information being used for indicating a state of the hostile "hero." In response to the state of the hostile "hero" being in a selectable state, the terminal may use a position of the hostile "hero" in the game scene as a displaying end point of a skill indicator, use a position of the "hero" controlled by the user in the game scene as a displaying start point of the skill indicator, and display the skill indicator based on the displaying start point and the displaying end point.

2. The terminal may determine a state of the target virtual object in real time, and determine, in response to the target virtual object being converted from the target state into another state, a third position of the target virtual object in the virtual scene before state conversion. The terminal displays the cast indication pattern of the skill based on a first position of the controlled virtual object in the virtual scene and the third position.

In this implementation, even if the state of the target virtual object is converted, the terminal may still display the cast indication pattern of the skill according to the position of the target virtual object before state conversion, to avoid a case that the cast indication pattern of the skill is displayed erroneously because of the state conversion of the target virtual object, to improve the hit rate of the skill, thereby improving man-machine interaction efficiency, and improving the game experience of the user.

Figure 8:
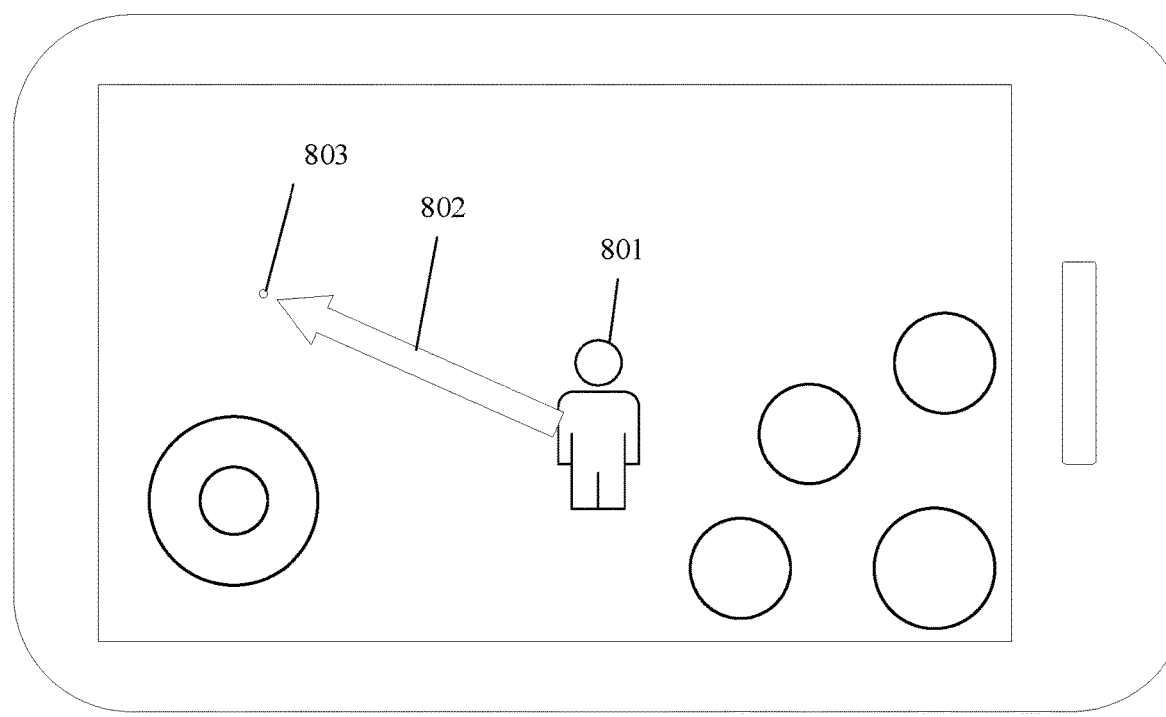
FIG. 8 is a schematic diagram of an interface according to an embodiment of this disclosure.

Using a MOBA game as an example, the another state may correspond to the foregoing unselectable state, and in response to the hostile "hero" being converted from the selectable state into the unselectable state, such as the hostile "hero" being converted from the selectable state into the field of view loss, the terminal may obtain the third position of the hostile "hero" in the game scene before the field of view loss from the server. The terminal may use the third position as a displaying end point of a skill indicator, use a position of the "hero" controlled by the user in the game scene as a displaying start point of the skill indicator, and display the skill indicator based on the displaying start point and the displaying end point. Referring to FIG. 8, 801 is the "hero" controlled by the user, 802 is the skill indicator, and 803 is the third position. Additionally, the terminal may further set an invisible reference virtual object on the third position, and display the cast indication pattern of the skill based on the reference virtual object and the position of the controlled virtual object in the virtual scene.

3. The terminal may display, in response to the target virtual object being converted from another state into the target state in a target time period, the cast indication pattern of the skill based on the positions of the controlled virtual object and the target virtual object in the virtual scene.

Figure 9:
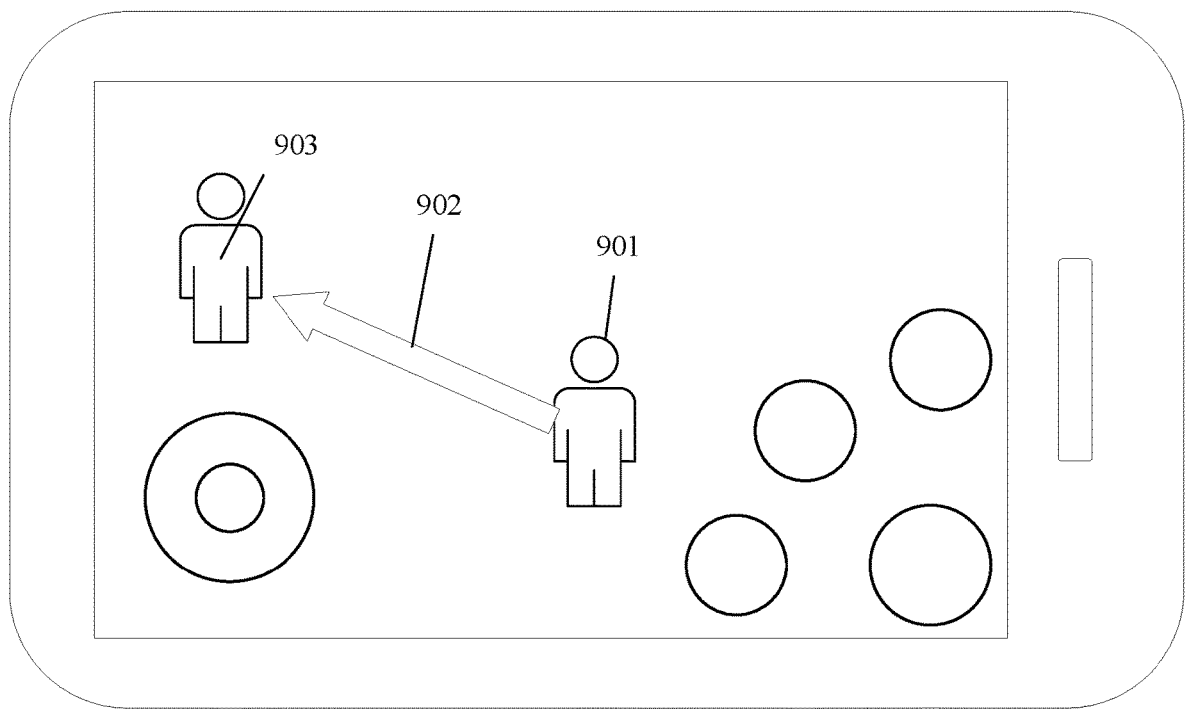
FIG. 9 is a schematic diagram of an interface according to an embodiment of this disclosure.

Using a MOBA game as an example, in response to the hostile "hero" being converted from the selectable state into the unselectable state, such as the hostile "hero" being converted from the selectable state into the field of view loss, the terminal may add a target cache state to the hostile "hero" through the server, where an existence time of the target cache state may be a target time period. In response to the hostile "hero" being converted from the unselectable state into the selectable state in the existence time of the target state, such as, the hostile "hero" being converted from the field of view loss into the selectable state, the terminal may use a position of the hostile "hero" in the game scene as a displaying end point of a skill indicator, use a position of the "hero" controlled by the user in the game scene as a displaying start point of the skill indicator, and display the skill indicator based on the displaying start point and the displaying end point. Referring to FIG. 9, 901 is the "hero" controlled by the user, 902 is the skill indicator, and 903 is the hostile "hero".

In response to no target virtual object of the controlled virtual object existing in the to-be-cast range, the terminal may display the cast indication pattern of the skill according to a pattern displaying method corresponding to the skill, where the pattern displaying method may be determined according to a type of the skill, or certainly may be determined according to another method. This is not limited in this embodiment of this disclosure.

In step 403, in response to a position of either virtual object of the controlled virtual object and the target virtual object being changed, a pointing direction of the cast indication pattern is adjusted according to the change in the position of the virtual object.

In some embodiments, the terminal adjusts, in response to a first position of the controlled virtual object in the virtual scene being changed, a displaying start point of the cast indication pattern of the skill with the change of the first position. The terminal adjusts, in response to a second position of the target virtual object in the virtual scene being changed, a displaying end point of the cast indication pattern of the skill with the change of the second position. In this implementation, the terminal may adjust the pointing direction of the cast indication pattern in real time according to the positions of the controlled virtual object and the target virtual object, so that the cast indication pattern may point from the controlled virtual object to the target virtual object, to improve the hit rate of the skill cast by the user, thereby improving man-machine interaction efficiency and game experience of the user.

Using a MOBA game as an example, in a game process, the user controls a "hero" to perform ceaseless "walking" to avoid a skill attack of a hostile "hero" and improve a success rate of controlling, by the user, the "hero" to perform a skill attack on the hostile "hero", and the terminal may adjust a displaying end point and a displaying start point of a skill indicator in real time according to changes in positions of the hostile "hero" and the "hero" controlled by the user, to ensure that the skill indicator is pointing from the "hero" controlled by the user to the hostile "hero," thereby improving the success rate of performing the skill attack by the "hero" controlled by the user on the hostile "hero".

In some embodiments, after step 403, the terminal may further perform step 404.

In step 404, the terminal casts, in response to a cast operation on the skill, the skill based on the cast direction indicated by the cast indication pattern of the skill.

In some embodiments, when the skill is triggered by the user by performing a touch operation of touching the first region of the skill key, correspondingly, the cast operation on the skill may be implemented by the user by stopping the touch operation of touching the first region of the skill key, such as, implemented by a lifting operation of a finger of the user. The terminal may cast, in response to the user stopping touching the first region of the skill key, the skill based on the cast direction indicated by the cast indication pattern of the skill.

In some embodiments, when the skill is triggered by a user by clicking/tapping the skill key, correspondingly, the cast operation of the skill may be implemented by the user by clicking/tapping the skill key again. The terminal may cast, in response to the user clicking/tapping the skill key again in a target time interval, the skill based on the cast direction indicated by the cast indication pattern of the skill. In this implementation, the user needs to click/tap the skill key twice to control the controlled virtual object to cast the skill, thereby avoiding a case that the hit rate of the skill is decreased because the skill is cast in advance due to erroneous touch. That is to say, this implementation may improve the hit rate of the skill, thereby improving man-machine interaction efficiency and game experience of the user.

Figure 10:
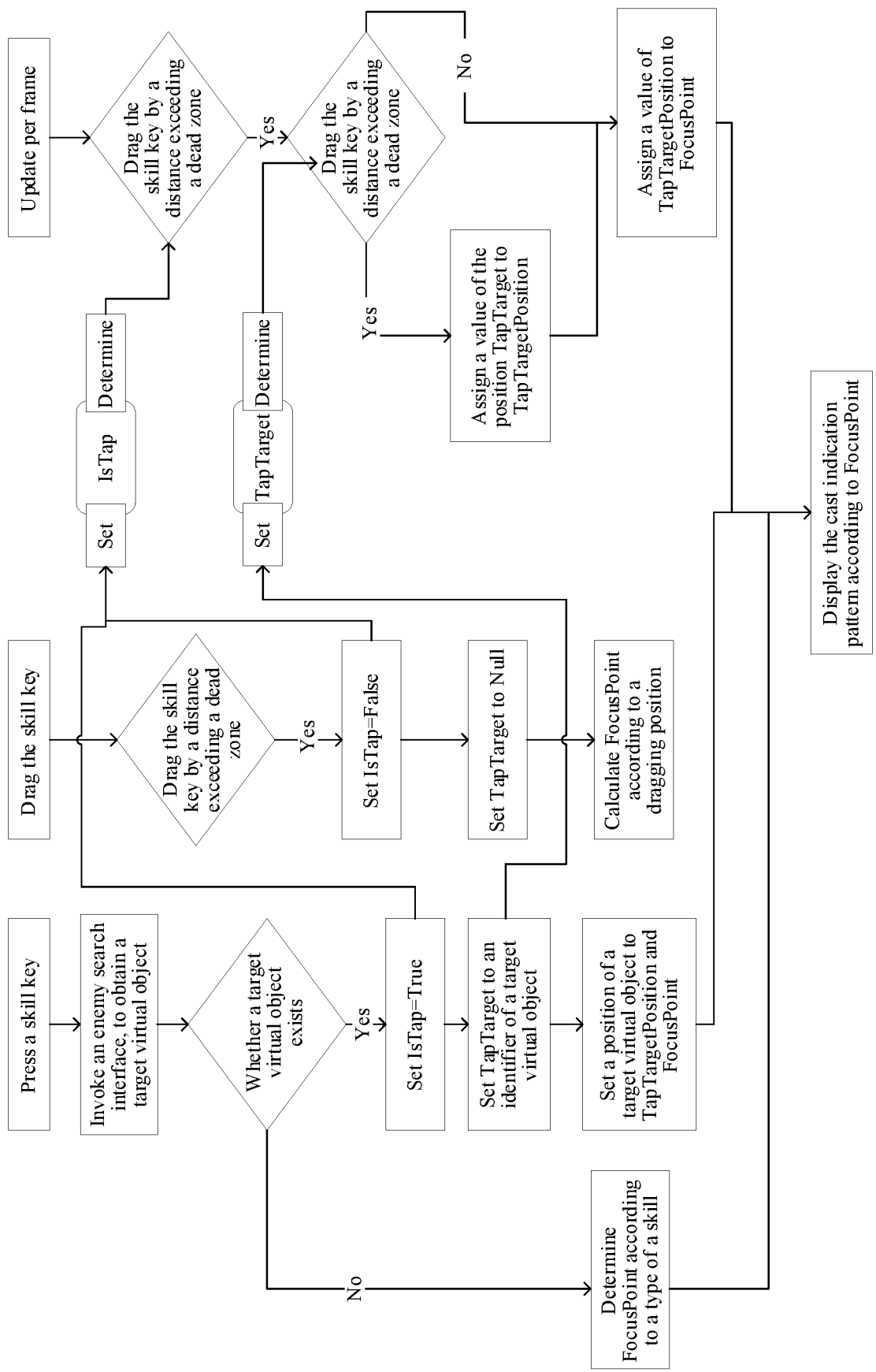
FIG. 10 is a diagram of back-end logic of a virtual object control method according to an embodiment of this disclosure.

Referring to FIG. 10, FIG. 10 provides an exemplary processing logic by which a terminal is used for performing the foregoing steps 401 to 404, and the processing logic is updated by using a frame as a unit, and includes the following.

Press a skill key: when a player presses the skill key, the terminal invokes an enemy search interface by using skill information, a current position of a virtual object controlled by the player, current screen information and the like as parameters, to obtain a target virtual object, and displays a cast indication pattern according to the skill information in a case that no target virtual object exists. When a target virtual object exists, the terminal may assign a value True to a field IsTap to indicate that the skill key has currently been pressed and frame-related logic needs to be updated. Then, a value of an identifier of the target virtual object is assigned to TapTarget. After the two steps are completed, it indicates that data has been prepared. The target virtual object obtained through current enemy search is definitely a virtual object in a target state. Therefore, there is no need to determine whether the target virtual object is in the target state, the terminal may directly use the position of the target virtual object and assign values to FocusPoint and TapTargetPosition, and then terminal may use the cast indication pattern and other skill generic logic to display the orientation or position of the cast indication pattern according to this position FocusPoint.

Update per frame: when the player presses the skill key but has not dragged the skill key or has dragged the skill key without exceeding a dead zone, the terminal needs to perform logic processing in update per frame. When the player has performed no operation, the state of the target virtual object is changed at any time, for example, the target actively uses a stasis skill, such as, walking into grass or another unselectable state. Therefore, the terminal first detects that this field IsTap is used for determining whether the skill needs to be processed, and it indicates that a target virtual object exists only when IsTap is True. In this case, a state of the target virtual object needs to be determined. For example, the target virtual object may be unselectable, but cannot be invisible. Certainly, the state of the target virtual object is also determined in enemy search logic of the skill. When the target virtual object is in the target state, the terminal updates TapTargetPosition, and assigns a value of the current position of the target virtual object to FocusPoint. When the target virtual object is in another state, the terminal directly assigns a value of TapTargetPosition to FocusPoint. In this case, the position of TapTargetPosition is a position of the target virtual object previously in the target state. In this way, the cast direction of the skill can have memorability, and a skill cast anticipation is not lost because the target virtual object is in another state, thereby helping the player hit an enemy.

Drag the skill key: this mechanism may be used for orientation and position skills. When the skill key is dragged, the terminal calculates FocusPoint according to a position of dragging the skill key by the player on the screen. When the player drags the skill key on the screen, it indicates that the player requires a more precise skill cast direction. Therefore, the terminal sets IsTap to False, sets TapTarget to null, and displays the cast indication pattern according to the position of dragging the skill key by the player on the screen.

Through the technical solutions provided in this disclosure, when there is a need to trigger a skill, the terminal may determine a to-be-cast range of the skill and a target virtual object in the to-be-cast range, and display a cast indication pattern of the skill according to positions of a controlled virtual object and the target virtual object. The terminal may adjust, in response to a position of either virtual object of the controlled virtual object and the target virtual object being changed, the displaying of the cast indication pattern of the skill in real time. In this way, it may be ensured that after the user triggers the skill, the terminal may automatically adjust a pointing direction of the cast indication pattern of the skill with the change in the position of the virtual object, so that the cast indication pattern may be associated with the position of the target virtual object. That is, during skill cast, the terminal may automatically aim at the target virtual object, and the user does not need to manually aim at the target virtual object, thereby improving man-machine interaction efficiency.

An embodiment of this disclosure further provides another virtual object control method, and the control method determines a cast target of a skill through the following steps 1 to 3, and, in some embodiments, step 4.

In step 1, a terminal determines, in response to a triggering operation on a skill in a virtual scene, a to-be-cast range of the skill.

For an implementation of this step, reference may be made to step 401, and details are not described herein again.

In step 2, the terminal uses, in response to a target virtual object existing in the to-be-cast range, the target virtual object as a cast target of the skill.

The foregoing skill is a skill that may be cast only when there is a cast target. Therefore, for this skill, after it is determined that there is a target virtual object, for example, the target virtual object may be a virtual object in a camp different from that of a virtual object controlled by the terminal user, the target virtual object is used as a cast target of the skill. Once it is detected that a cast operation of the skill or the skill meets a cast condition (for example, a triggering duration exceeds a preset duration), the skill may be cast to the target virtual object.

In some embodiments, the terminal may display the cast indication pattern of the skill based on the positions of the controlled virtual object and the target virtual object in the virtual scene, the cast indication pattern pointing to the target virtual object. This embodiment of this disclosure may further provide a cast indication pattern displaying function, to make it convenient to guide the user to perform a cast operation on the skill, for example, perform an operation in a direction indicated by the cast indication pattern, to make it convenient to accurately perform skill cast, thereby attacking the target virtual object, and improving man-machine interaction efficiency. Using a MOBA game as an example, when the user controls a "hero" to cast a skill A, when an opposing "hero" A exists in a to-be-cast range of the skill A, the terminal may display a skill indicator according to a position of the "hero" controlled by the user and a position of the opposing "hero" A, the skill indicator pointing to the opposing "hero" A.

In step 3, the terminal creates, in response to the target virtual object being moved out of the to-be-cast range, a reference virtual object on a target position in the to-be-cast range, and updates the reference virtual object to the cast target of the skill.

The target position is a position of the target virtual object in the virtual scene before being moved out of the to-be-cast range, and the position is in the to-be-cast range, for example, the position may be an edge position in the to-be-cast range.

The foregoing created reference virtual object is not a virtual object in any camp, but a virtual object specially used for providing an aiming auxiliary function, and the reference virtual object may assist, when a target is lost, the user in casting a skill without another virtual object. After the skill is cast, the reference virtual object created on the target position may be deleted, to avoid occupying internal memory.

In this aspect, for some skills that can be cast only when there is a definite cast target, when the determined cast target runs out of a to-be-cast range, a reference virtual object used for providing an aiming auxiliary function is created in a manner of creating something from nothing, to implement skill cast, to simulate a real interaction scene. Even if a target virtual object serving as the cast target moves, a skill that has a specific effect range may still cause specific damage to the escaping target virtual object based on the effect range of the skill, and there is no need to manually adjust the skill cast over and over again, thereby greatly improving man-machine interaction efficiency.

In some embodiments, the terminal may obtain a position of the target virtual object before being moved out of the to-be-cast range; and the terminal determines the position as a target position, creates a reference virtual object on the target position, and updates the reference virtual object to a cast target of the skill. A position of the target virtual object before being moved out of the to-be-cast range may be a position of the target virtual object in a frame of picture before being moved out of the to-be-cast range. The process may include: obtaining a current picture moment in response to the position of the target virtual object exceeding the to-be-cast range, and obtaining a position of the target virtual object in a frame of picture previous to the current picture moment as the foregoing target position.

In this implementation, the reference virtual object is set on a position of the target virtual object before running out, thereby ensuring that the skill cast can be tightly attached to the target virtual object, to provide a more real attack effect, so that the skill cast can have a maximum damage and deterrence action on the target virtual object, and then the user does not need to perform manual adjustment, thereby improving man-machine interaction efficiency.

In some embodiments, the reference virtual object may be an invisible virtual object. In response to the target virtual object being moved out of the to-be-cast range, the terminal may determine a target position of the target virtual object before being moved out of the to-be-cast range, and display the cast indication pattern of the skill according to the position of the controlled virtual object and the target position, the cast indication pattern pointing to the target position. In this implementation, the reference virtual object set by the terminal neither affects the displaying of the virtual scene, nor interferes with operations of the user, thereby improving game experience of the user.

Using a MOBA game as an example, when an opposing "hero" A leaves a to-be-cast range of a skill A cast by a "hero" controlled by a user, the terminal may determine a target position of the opposing "hero" A before leaving the to-be-cast range of the skill A, to serve as a position for subsequently creating a reference virtual object.

In some embodiments, after step 3, the terminal may further perform step 4.

In step 4, in response to the target virtual object being moved back to the to-be-cast range before the skill is cast, the target virtual object is updated to the cast target of the skill.

In this implementation, when the target virtual object returns to the to-be-cast range again, the cast target may be updated in time, thereby automatically switching the cast target of the skill based on movement of the target virtual object, and then the user does not need to manually adjust the skill again to replace the cast target, thereby improving man-machine interaction efficiency.

In the foregoing process, the cast target may alternatively be updated based on a change in the state of the target virtual object or the like. For example, if the target virtual object switches from the first state to the second state, and the target virtual object in the second state does not meet the cast condition of the skill, the cast target may be updated to a virtual object in the first state in the to-be-cast range, to meet the cast condition of the skill.

Additionally, in the foregoing virtual object control method, an auxiliary action on an attack may alternatively be implemented with reference to a feature about the cast indication pattern in the foregoing method shown in FIG. 4, to ensure accuracy of the cast operation, thereby improving man-machine interaction efficiency.

Figure 11:
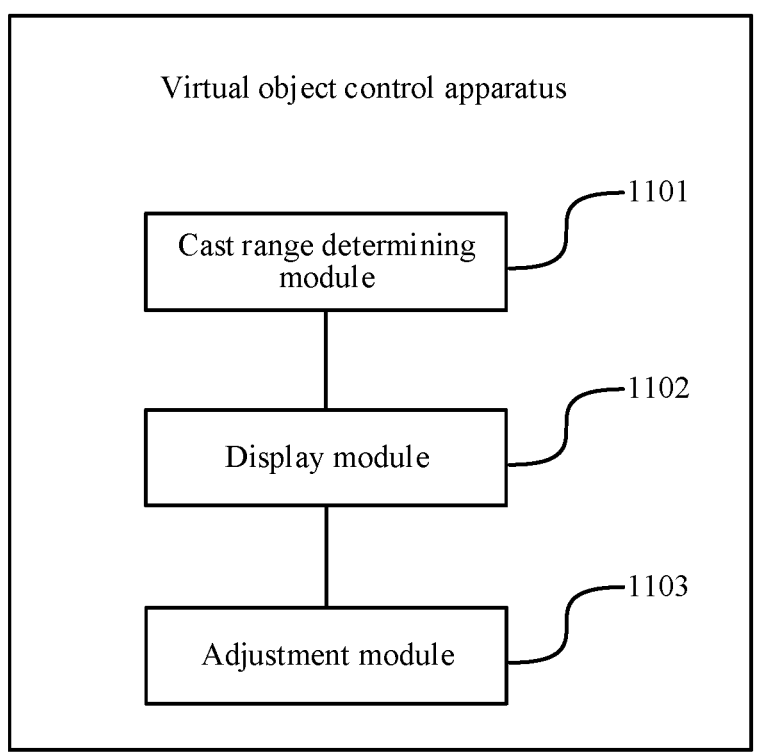
FIG. 11 is a schematic structural diagram of a virtual object control apparatus according to an embodiment of this disclosure.

FIG. 11 is a schematic structural diagram of a virtual object control apparatus according to an embodiment of this disclosure. Referring to FIG. 11, the apparatus includes a cast range determining module 1101, a display module 1102, and an adjustment module 1103. One or more modules of the apparatus can be implemented by processing circuitry, software, or a combination thereof, for example.

The cast range determining module 1101 is configured to determine, in response to a triggering operation on a skill in a virtual scene, a to-be-cast range of the skill.

The display module 1102 is configured to display, in response to a target virtual object of a controlled virtual object existing in the to-be-cast range, a cast indication pattern of the skill based on positions of the controlled virtual object and the target virtual object in the virtual scene, the cast indication pattern representing a cast direction of the skill in the virtual scene.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The adjustment module 1103 is configured to adjust, in response to a position of a virtual object, of the controlled virtual object and the target virtual object, being changed, a pointing direction of the cast indication pattern according to the change in the position of the virtual object. The controlled virtual object is a virtual object controlled by a current terminal, and the target virtual object is a virtual object in a camp different from that of the controlled virtual object.

In some embodiments, the cast range determining module is configured to trigger the skill in response to a touch operation on a first region of a skill key, and determine the to-be-cast range of the skill, where the skill key includes the first region and a second region, and the first region and the second region correspond to different skill cast direction determining methods.

In some embodiments, the display module is further configured to display, in response to a dragging operation on the second region of the skill key, the cast indication pattern of the skill based on a position indicated by the dragging operation.

In some embodiments, the display module is further configured to display, based on a correspondence between screen coordinates of the position indicated by the dragging operation and coordinates in the virtual scene, the cast indication pattern of the skill in the virtual scene.

In some embodiments, the adjustment module is further configured to adjust, in response to the position indicated by the dragging operation being changed, the displaying of the cast indication pattern of the skill with the change in the position indicated by the dragging operation.

In some embodiments, the display module is configured to determine a displaying start point of the cast indication pattern of the skill according to a first position of the controlled virtual object in the virtual scene; determine a displaying end point of the cast indication pattern of the skill according to a second position of the target virtual object in the virtual scene; and display the cast indication pattern of the skill based on the displaying start point and the displaying end point.

In some embodiments, the adjustment module is configured to adjust, in response to a first position of the controlled virtual object in the virtual scene being changed, a displaying start point of the cast indication pattern of the skill based on a changed first position; and adjust, in response to a second position of the target virtual object in the virtual scene being changed, a displaying end point of the cast indication pattern of the skill based on a changed second position.

In some embodiments, the apparatus further includes a target state determining module, configured to perform, in response to the target virtual object being in a target state, the operation of displaying the cast indication pattern of the skill.

In some embodiments, the apparatus further includes a position determining module, configured to determine, in response to the target virtual object being converted from the target state into another state, a third position of the target virtual object in the virtual scene before state conversion.

The display module is further configured to display the cast indication pattern of the skill based on a first position of the controlled virtual object in the virtual scene and the third position.

In some embodiments, the display module is further configured to set an invisible reference virtual object on the third position, and display the cast indication pattern of the skill based on the reference virtual object and the position of the controlled virtual object in the virtual scene.

In some embodiments, the display module is further configured to display, in response to the target virtual object being converted from another state into the target state in a target time period, the cast indication pattern of the skill based on the positions of the controlled virtual object and the target virtual object in the virtual scene.

When the virtual object control apparatus provided in the foregoing embodiments controls the virtual object, only division of the foregoing functional modules is used as an example for description. In the practical application, the functions may be allocated to and completed by different functional modules according to requirements. That is, an internal structure of a computer device is divided into different functional modules, to complete all or some of the functions described above. In addition, the virtual object control apparatus and the virtual object control method provided in the foregoing embodiments belong to the same concept. For a specific implementation process, refer to the method embodiment, and details are not described herein again.

Through the technical solutions provided in this disclosure, when there is a need to trigger a skill, the terminal may determine a to-be-cast range of the skill and a target virtual object in the to-be-cast range, and display a cast indication pattern of the skill according to positions of a controlled virtual object and the target virtual object. The terminal may adjust, in response to a position of either virtual object of the controlled virtual object and the target virtual object being changed, the displaying of the cast indication pattern of the skill in real time. In this way, it may be ensured that after the user triggers the skill, the terminal may automatically adjust a pointing direction of the cast indication pattern of the skill with the change in the position of the virtual object, so that the cast indication pattern may be associated with the position of the target virtual object. That is, during skill cast, the terminal may automatically aim at the target virtual object, and the user does not need to manually aim at the target virtual object, thereby improving man-machine interaction efficiency.

Figure 12:
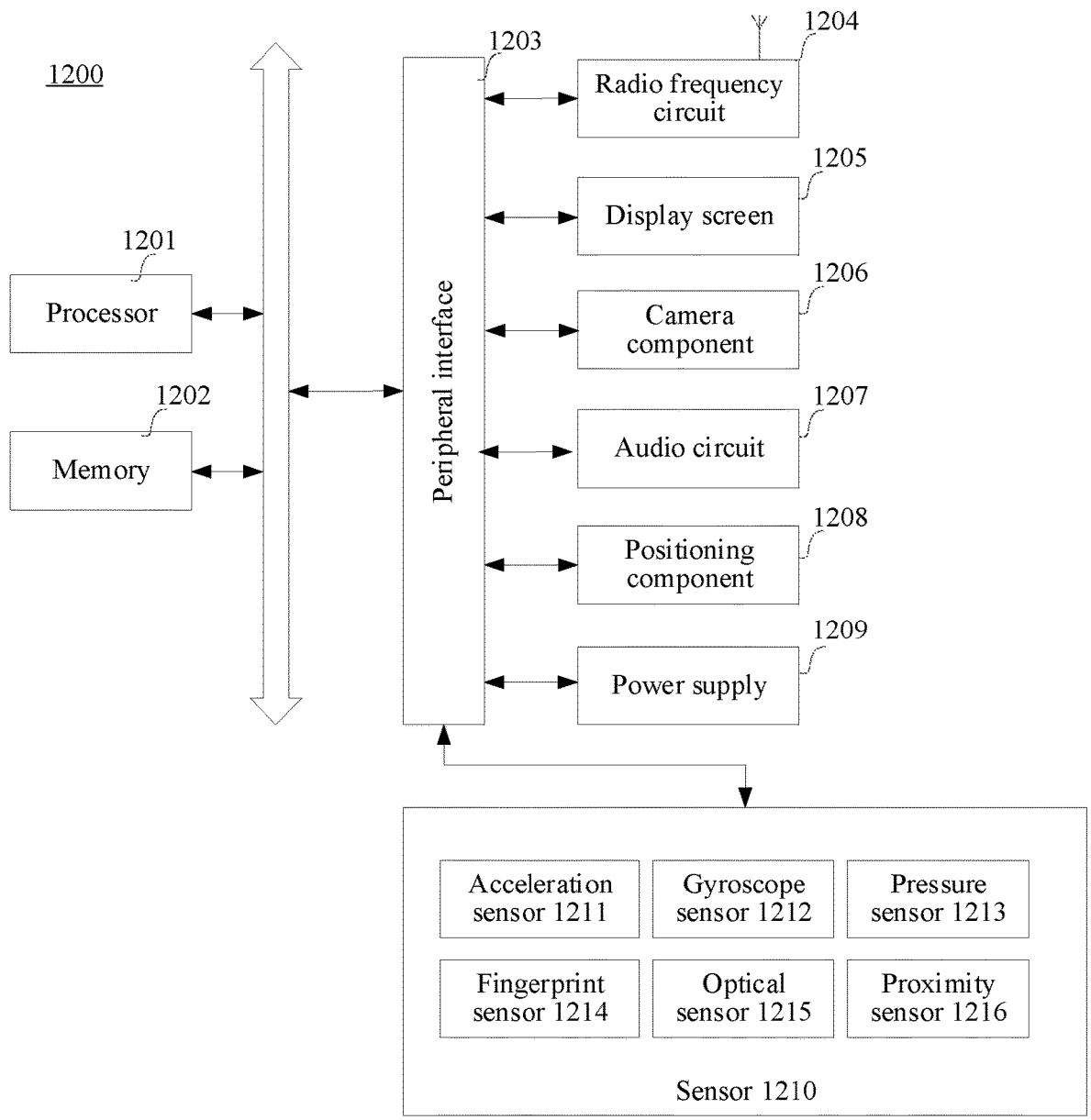
FIG. 12 is a schematic structural diagram of a terminal according to an embodiment of this disclosure.

An embodiment of this disclosure provides a computer device, configured to perform the foregoing method, the computer device may be implemented as a terminal, and a structure of the terminal is described below:

FIG. 12 is a schematic structural diagram of a terminal according to an embodiment of this disclosure. The terminal 1200 may be a smartphone, a tablet computer, a notebook computer, or a desktop computer. The terminal 1200 may also be referred to as other names such as user equipment, a portable terminal, a laptop terminal, or a desktop terminal.

Generally, the terminal 1200 includes one or more processors 1201 and one or more memories 1202.

The processor 1201 may include one or more processing cores, for example, a 4-core processor or an 8-core processor. The processor 1201 may be implemented in at least one hardware form of a digital signal processor (DSP), a field-programmable gate array (FPGA), and a programmable logic array (PLA). The processor 1201 may alternatively include a main processor and a coprocessor. The main processor is configured to process data in an awake state, also referred to as a central processing unit (CPU); and the coprocessor is a low-power processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process a calculation operation related to machine learning.

The memory 1202 may include one or more computer-readable storage media. The computer-readable storage medium may be non-transient. The memory 1202 may further include a high-speed random access memory and a non-volatile memory such as one or more magnetic disk storage devices and a flash storage device. In some embodiments, a non-transitory computer-readable storage medium in the memory 1202 is configured to store at least one instruction, the at least one instruction being configured to be executed by the processor 1201 to implement the virtual object control method provided in the method embodiments of this disclosure.

In some embodiments, the terminal 1200 may optionally include a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. Specifically, the peripheral device includes at least one of a radio frequency circuit 1204, a display screen 1205, a camera assembly 1206, an audio circuit 1207, a positioning assembly 1208, and a power supply 1209.

In some embodiments, the terminal 1200 further includes one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

A person skilled in the art may understand that the structure shown in FIG. 12 does not constitute a limitation on the terminal 1200, and the terminal may include more or fewer components than those shown in the figure, or some components may be combined, or a different component deployment may be used.

An embodiment of this disclosure further provides a virtual object control apparatus, including: a cast range determining module, configured to determine, in response to a triggering operation on a skill in a virtual scene, a to-be-cast range of the skill; a cast target determining module, configured to use, in response to a target virtual object existing in the to-be-cast range, the target virtual object as a cast target of the skill; and a cast target update module, configured to create, in response to the target virtual object being moved out of the to-be-cast range, a reference virtual object on a target position in the to-be-cast range, and update the reference virtual object to the cast target of the skill.

In some embodiments, the cast target determining module is configured to obtain a position of the target virtual object before being moved out of the to-be-cast range; and determine the position as the target position, and creating the reference virtual object on the target position.

In some embodiments, the cast target update module is further configured to update, in response to the target virtual object being moved back to the to-be-cast range before the skill is cast, the target virtual object to the cast target of the skill.

In some embodiments, the reference virtual object is an invisible virtual object.

In an exemplary embodiment, a computer-readable storage medium, such as a memory including an instruction, is further provided, and the instruction may be executed by a processor (processing circuitry) to complete the virtual object control method in the foregoing embodiments. For example, the computer-readable storage medium may be a read-only memory (ROM), a RAM, a compact disc ROM (CD-ROM), a magnetic tape, a floppy disk, an optical data storage device, or the like.

In an exemplary embodiment, a computer program product is further provided, including one or more instructions, the one or more instructions being executed by a processor (processing circuitry) of an electronic device, to complete the virtual object control method provided in the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

The invention claimed is:

1. A virtual object control method, comprising:
   determining, by processing circuitry in response to a triggering operation on a skill of a controlled virtual object in a virtual scene, a to-be-cast range of the skill;
   determining whether a target virtual object is located in the determined range of the skill;
   in response to determining that the target virtual object is located in the determined range of the skill of the controlled virtual object, displaying a cast direction or a cast location of the skill based on positions of the controlled virtual object and the target virtual object in the virtual scene; and
   in response to a determination that a position of the controlled virtual object or a position of the target virtual object has changed, adjusting the displayed cast direction or cast location according to the change in the position of the controlled virtual object or the target virtual object.

2. The method according to claim 1, further comprising:
determining, in response to the target virtual object being converted from a target state into a second state that is not the target state, a third position of the target virtual object in the virtual scene before state conversion; and
displaying the cast direction or the cast location of the skill based on a first position of the controlled virtual object in the virtual scene and the determined third position.

3. The method according to claim 2, wherein the displaying the cast direction or the cast location of the skill based on the first position further comprises:
setting a reference virtual object on the third position, and displaying the cast direction or the cast location of the skill based on a position of the reference virtual object and the first position of the controlled virtual object in the virtual scene.

4. The method according to claim 2, further comprising:
displaying, in response to the target virtual object being converted from the second state into the target state in a target time period, the cast direction or the cast location of the skill based on the positions of the controlled virtual object and the target virtual object in the virtual scene.

5. The method according to claim 1, wherein the determining the to-be-cast range of the skill further comprises:
triggering the skill in response to a touch operation on a first region of a skill key, and determining the to-be-cast range of the skill, wherein
the skill key comprises the first region and a second region, and the first region and the second region correspond to different skill cast direction determining methods.

6. The method according to claim 5, further comprising:
displaying, in response to a dragging operation on the second region of the skill key, the cast direction or the cast location of the skill, based on a position indicated by the dragging operation.

7. The method according to claim 6, wherein the displaying the cast direction or the cast location of the skill based on the position indicated by the dragging operation further comprises:
displaying, based on a correspondence between screen coordinates of the position indicated by the dragging operation and coordinates in the virtual scene, the cast direction or the cast location of the skill in the virtual scene.

8. The method according to claim 6, wherein after the displaying the cast direction or the cast location of the skill, the method further comprises:
adjusting, in response to the position indicated by the dragging operation being changed, the displaying of the cast direction or the cast location of the skill with the change in the position indicated by the dragging operation.

9. The method according to claim 1, wherein the displaying the cast direction or the cast location of the skill further comprises:
determining a displaying start point of the cast direction or the cast location of the skill according to a first position of the controlled virtual object in the virtual scene;
determining a displaying end point of the cast direction or the cast location of the skill according to a second position of the target virtual object in the virtual scene; and
displaying the cast direction or the cast location of the skill based on the displaying start point and the displaying end point.

10. The method according to claim 1, wherein the adjusting further comprises:
adjusting, in response to a first position of the controlled virtual object in the virtual scene being changed, a displaying start point of the cast direction or the cast location of the skill based on a changed first position; and
adjusting, in response to a second position of the target virtual object in the virtual scene being changed, a displaying end point of the cast direction or the cast location of the skill based on a changed second position.

11. The method according to claim 5, further comprising:
displaying, in response to the touch operation on the first region of the skill key, the cast direction or the cast location of the skill, based on positions of the controlled virtual object and the target virtual object in the virtual scene.

12. A virtual object control method, comprising:
determining, by processing circuitry in response to a triggering operation on a skill in a virtual scene, a to-be-cast range of the skill;
in response to a determination that a target virtual object is located in the to-be-cast range, setting the target virtual object as a cast target of the skill;
determining whether the target virtual object was previously located in the to-be-cast range and has moved out of the to-be-cast range; and
in response to a determination that the target virtual object was previously located in the to-be-cast range and has moved out of the to-be-cast range, generating a reference virtual object on a target position in the to-be-cast range, and setting the reference virtual object as the cast target of the skill, wherein the target position of the generated reference virtual object is a last location of the target virtual object in the to-be-cast range before the target virtual object moved out of the to-be-cast range.

13. The method according to claim 12, wherein the generating further comprises:
obtaining a position of the target virtual object before being moved out of the to-be-cast range; and
determining the obtained position as the target position, and generating the reference virtual object on the target position.

14. The method according to claim 12, further comprising:
updating, in response to the target virtual object being moved back to the to-be-cast range before the skill is cast, the target virtual object to the cast target of the skill.

15. The method according to claim 12, wherein the reference virtual object is an invisible virtual object.

16. A virtual object control apparatus, comprising:
circuitry configured to
determine, in response to a triggering operation on a skill of a controlled virtual object in a virtual scene, a to-be-cast range of the skill;
determine whether a target virtual object is located in the determined range of the skill;
in response to determining that the target virtual object is located in the determined range of the skill of the controlled virtual object, a cast direction or a cast location of the skill based on positions of the controlled virtual object and the target virtual object in the virtual scene; and in response to a determination that a position of the controlled virtual object or a position of the target virtual object has changed, adjust the displayed cast direction or cast location according to the change in the position of the controlled virtual object or the target virtual object.

17. A computer device, comprising processing circuitry and one or more memories storing at least one instruction, the at least one instruction being loaded and executed by the processing circuitry to implement operations performed in the virtual object control method according to claim 1.

18. A non-transitory computer-readable storage medium, storing at least one instruction, the instruction being loaded and executed by processing circuitry to implement operations performed in the virtual object control method according to claim 1.

19. The virtual object control apparatus of claim 16, wherein the circuitry is further configured to:

determine, in response to the target virtual object being converted from a target state into a second state that is not the target state, a third position of the target virtual object in the virtual scene before state conversion; and display the cast direction or the cast location of the skill based on a first position of the controlled virtual object in the virtual scene and the third position.

20. The virtual object control apparatus of claim 19, wherein the circuitry, in displaying the cast direction or the cast location of the skill based on the first position, is further configured to:

set a reference virtual object on the third position, and display the cast direction or the cast location of the skill based on the reference virtual object and the position of the controlled virtual object in the virtual scene.

* * * * *